United States Patent
Breedvelt-Schouten et al.

(10) Patent No.: US 10,834,466 B1
(45) Date of Patent: Nov. 10, 2020

(54) VIRTUAL INTERACTIVITY FOR A BROADCAST CONTENT-DELIVERY MEDIUM

(71) Applicant: INTERNATIONAL BUSINESS MACHINES CORPORATION, Armonk, NY (US)

(72) Inventors: Ilse M. Breedvelt-Schouten, Manotick (CA); John A. Lyons, Ottawa (CA); Jeffrey A. Kusnitz, Campbell, CA (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/529,954

(22) Filed: Aug. 2, 2019

(51) Int. Cl.
| | |
|---|---|
| *H04N 7/16* | (2011.01) |
| *H04N 21/478* | (2011.01) |
| *H04N 21/422* | (2011.01) |
| *H04N 21/442* | (2011.01) |
| *H04N 21/8545* | (2011.01) |
| *H04N 21/466* | (2011.01) |

(52) U.S. Cl.
CPC . *H04N 21/47815* (2013.01); *H04N 21/42203* (2013.01); *H04N 21/44222* (2013.01); *H04N 21/8545* (2013.01); *H04N 21/466* (2013.01)

(58) Field of Classification Search
None
See application file for complete search history.

(56) References Cited

U.S. PATENT DOCUMENTS

| | | | |
|---|---|---|---|
| 8,392,265 B2* | 3/2013 | Reynolds | H04N 21/25891 705/26.1 |
| 9,009,064 B2* | 4/2015 | Karlin | G06Q 30/0246 705/14.16 |
| 2004/0237114 A1* | 11/2004 | Drazin | H04H 60/94 725/105 |

(Continued)

OTHER PUBLICATIONS

Stackpole, Beth, "New Tech Lets You Click on a TV Commercial and Buy What's on the Screen", HubSpot, 10 pages, printed Nov. 12, 2018, <https://blog.hubspot.com/opinion/new-tech-lets-you-click-on-a-tv-commercial-and-buy-whats-on-the-screen>.

*Primary Examiner* — William J Kim
(74) *Attorney, Agent, or Firm* — Schmeiser, Olsen & Watts; Stephanie Carusillo (57) ABSTRACT

A voice-controlled device monitors content delivered to a user through a non-interactive or unidirectional medium, such as broadcast television or radio. Each time the device recognizes delivered content that includes an advertisement or solicitation, the device records information identifying the content and the time at which the content is delivered. The device also listens for environmental audio cues suggesting that a user has performed a desired action in response to viewing or hearing the recognized content. If the device determines that a user response has occurred within a predetermined duration of time after a corresponding advertisement or solicitation, the device correlates the response with the content. The device then performs a corresponding activity, such as notifying the content-delivery service that a royalty should be collected from the content's source; directly transferring a royalty from the source's account to the service's account; or updating response-rate statistics associated with the content.

20 Claims, 5 Drawing Sheets

(56) References Cited

U.S. PATENT DOCUMENTS

| | | | |
|---|---|---|---|
| 2005/0165663 A1* | 7/2005 | Razumov | G06Q 30/0619 705/26.44 |
| 2007/0107008 A1* | 5/2007 | Dybus | G06Q 30/02 725/9 |
| 2007/0124756 A1* | 5/2007 | Covell | H04N 5/445 725/18 |
| 2007/0186165 A1* | 8/2007 | Maislos | G06Q 30/02 715/728 |
| 2007/0186228 A1* | 8/2007 | Ramaswamy | H04N 21/42201 725/14 |
| 2008/0082510 A1* | 4/2008 | Wang | H04H 60/40 |
| 2008/0219641 A1* | 9/2008 | Sandrew | G11B 27/105 386/201 |
| 2008/0248815 A1* | 10/2008 | Busch | H04W 4/025 455/456.5 |
| 2009/0157697 A1* | 6/2009 | Conway | G11B 27/031 |
| 2009/0240538 A1* | 9/2009 | Sweeney | G06Q 30/0273 705/14.69 |
| 2012/0130796 A1* | 5/2012 | Busch | G06Q 30/0267 705/14.36 |
| 2012/0253920 A1* | 10/2012 | Yarvis | H04N 21/26283 705/14.41 |
| 2013/0014136 A1* | 1/2013 | Bhatia | H04N 21/4222 725/9 |
| 2013/0203397 A1* | 8/2013 | Vidal | H04M 1/677 455/418 |
| 2013/0294588 A1* | 11/2013 | Burger | H04M 3/42382 379/88.01 |
| 2013/0305158 A1* | 11/2013 | Vasquez | H04N 21/44218 715/733 |
| 2013/0347018 A1* | 12/2013 | Limp | H04N 21/4394 725/19 |
| 2014/0057610 A1* | 2/2014 | Olincy | H04M 3/42365 455/414.1 |
| 2014/0156387 A1* | 6/2014 | Bruich | G06Q 30/0246 705/14.45 |
| 2014/0278896 A1* | 9/2014 | Anand | G06Q 50/01 705/14.32 |
| 2014/0379456 A1* | 12/2014 | Miller | G06Q 30/0242 705/14.41 |
| 2015/0019074 A1* | 1/2015 | Winter | B60K 37/06 701/36 |
| 2016/0379245 A1* | 12/2016 | Dey | G06Q 30/0267 705/14.45 |
| 2017/0132688 A1* | 5/2017 | Freund | G06Q 50/01 |
| 2018/0165688 A1* | 6/2018 | Ismail | G06Q 30/02 |
| 2019/0180740 A1* | 6/2019 | Nandy | G10L 15/30 |

* cited by examiner

VIRTUAL INTERACTIVITY FOR A BROADCAST CONTENT-DELIVERY MEDIUM

BACKGROUND

The present invention relates in general to broadcast content-delivery media and in particular to simulating bidirectional communications linking broadcast content to user actions in a bidirectional medium.

Content providers use bidirectional communications capabilities of interactive computing platforms, such as Internet Web sites, to monetize online commercial activity. For example, when a user clicks an advertisement or other link displayed on a cloud-hosted Web page, the host automatically detects the click and responds by billing the advertiser or other content provider accordingly.

Unlike bidirectional platforms and communications media, unidirectional and broadcast media do not permit mouse clicks, spoken commands, or other types of user input. Unidirectional platforms thus have no way to detect that a user has responded to an advertisement or other type of broadcast content. This is true even if the user performs a desired action through a distinct, bidirectional mechanism like a mobile device or desktop computer, such as by using a smartphone to order food from a particular restaurant after viewing a television advertisement for that restaurant. Accordingly, broadcast media are not configured to automatically bill an advertiser or other content provider when a user responds to broadcast content by performing a desired action.

SUMMARY

Embodiments of the present invention comprise systems, methods, and computer program products that add virtual interactivity to a non-interactive broadcast content-delivery medium. A voice-controlled smart-home device monitors audio/video content delivered to a user through a broadcast or unidirectional medium, such as broadcast television or radio. The device attempts to identify elements of the delivered content by listening to the content through an audio interface, by viewing the content through a camera or other visual-input device, by intercepting the content electronically, or by referring to predetermined content-delivery schedules. Each time the device determines that delivered content includes an advertisement or solicitation or invitation to perform a particular action, the device records information identifying the recognized content and the time at which the content was delivered. The device then listens, via an audio interface, for sounds indicating that a user has performed a desired action, such as ordering advertised goods or services, in response to viewing or hearing the recognized content. If the user responds within a predetermined duration of time after the recorded content-delivery time, the device correlates the user's response with the recognized content. In some cases, the system identifies the correlation by first determining that a user has performed a potentially desirable action and then searching the system's record of the delivered content for a corresponding advertisement, solicitation, or invitation. The device responds to such a correlation by performing a corresponding activity described by predefined rules and data, such as rules and data stored internally in the smart device, stored in a self-learning knowledgebase, or retrieved from an extrinsic source. The corresponding activity may include any tasks that would be performed by a bidirectional, interactive content-delivery medium upon detecting that a user has responded to an advertisement or to an invitation to perform a particular action.

DETAILED DESCRIPTION

Embodiments of the present invention use voice-recognition technology similar to that of a "smart-home speaker" to identify that a user performs a certain action in response to certain content received through a broadcast medium. The system then performs background activities related to the user's performance of the desired action.

Such embodiments may identify that the user has viewed broadcast or unidirectionally delivered content through any means known in the art, such as by listening for distinctive sounds that identify the content, or by referring to a previously supplied content-delivery schedule that identifies the time at which each commercial is broadcast on a particular television channel.

Embodiments may also use any known means to determine that a user has performed a desired response. For example, a smart-home device may listen for certain keywords in a user's voice that indicate that the user has ordered an advertised product or performed another desired action.

In embodiments where broadcast programming is being played by the smart-home device itself, or where the user performs the desired response through the smart-home device, the device may use an internal rule or database to automatically correlate the broadcast content with a user response. Here, the stored rule or data would allow the device to determine that a user has viewed specific content at a particular time and to further determine whether the user's subsequent action can be correlated with the receipt of that content.

Regardless of how the detecting and correlating are implemented, the smart-home device responds to an identification of a correlation by performing a predetermined back-end operation, such as authorizing an e-commerce payment, specified by stored logic or data. The device selects an appropriate operation as a function of both the content and the user response. For example, after detecting that a user has ordered cookware immediately after viewing a television commercial or infomercial for that cookware, the device would notify the television station that the station may collect a micropayment from the cookware manufacturer or advertiser. The device in this case would identify the infomercial and the user's response through known means, such as by referring to a previously stored broadcast schedule or by listening for keywords through an audio interface.

The details of the back-end action would be specified by a predetermined rule of a rulebase or knowledgebase or by referring to payment table that identifies a payer, a payee, a payment amount, and characteristics of user actions that trigger a payment.

In essence, the invention improves known unidirectional content-delivery systems by providing the ability to track a user's "virtual" responses through indirect integration with a bidirectional communications mechanism. This allows compliant smart devices to enhance broadcast advertisements and other types of unidirectionally delivered content by giving users the ability to indirectly (or "virtually") submit input upon which the content-delivery medium can base e-commerce transactions and other types of activities.

In a summary example, a computer-enhanced "smart-home" speaker device, by listening to sounds in a user's living room, detects that the user has ordered food from a pizza-delivery service shortly after viewing a broadcast television commercial for that service. The user may have ordered the food through any means that can be monitored by the device, such as by orally placing the order through a smartphone, or by commanding the smart device itself to order the food. Similarly, the commercial may have been viewed by the user or detected by the smart device through any known means. For example, the smart device itself may stream the commercial through the user's television or phone, or the smart device may listen for identifying sounds that allow the device to determine that the commercial is being viewed by the user on an unspecified viewing device. In such cases, the device would respond to the device's identification of temporal proximity between the commercial and the food order by reporting to the commercial broadcaster that the delivery service owes the broadcaster a royalty payment.

Although most of the examples and embodiments presented in this patent describe implementations built around e-commerce transactions and user responses to broadcast-television commercials, the present invention is flexible enough to accommodate other types of transactions, user actions, delivered content, and content-delivery mechanisms.

For if an embodiment detects that a user has chosen to play a song suggested by a streaming music service, the system might respond by notifying the service that it owes a royalty payment to the song's publisher.

Other embodiments can add similar functionality to broadcast radio media, allowing a smart-home device to authorize micropayments to copyright holders or merchants in response to determining that a user has, on a particular radio station, heard certain content or purchased a particular product or service in response to hearing a certain ad In a more exotic example, an enhanced smart device might listen for speech indicating that a user is using a smartphone to download product literature for a vehicle that has just been the subject of a motion-picture product placement broadcast over a streaming-television service. The device would respond by authorizing a micropayment from the vehicle manufacturer to the streaming service or to a party affiliated with the motion picture.

Any of the above functionality may be incorporated into any appropriate form factor or class of product currently or in the future known in the field. Such platforms include standalone smart-home speaker-type devices or and any other type of device capable of detecting and understanding local audio or of responding to voice commands, such as a smart TV or radio, a smartphone, a user interface of a streaming-audio service, or a networked music-playing device.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
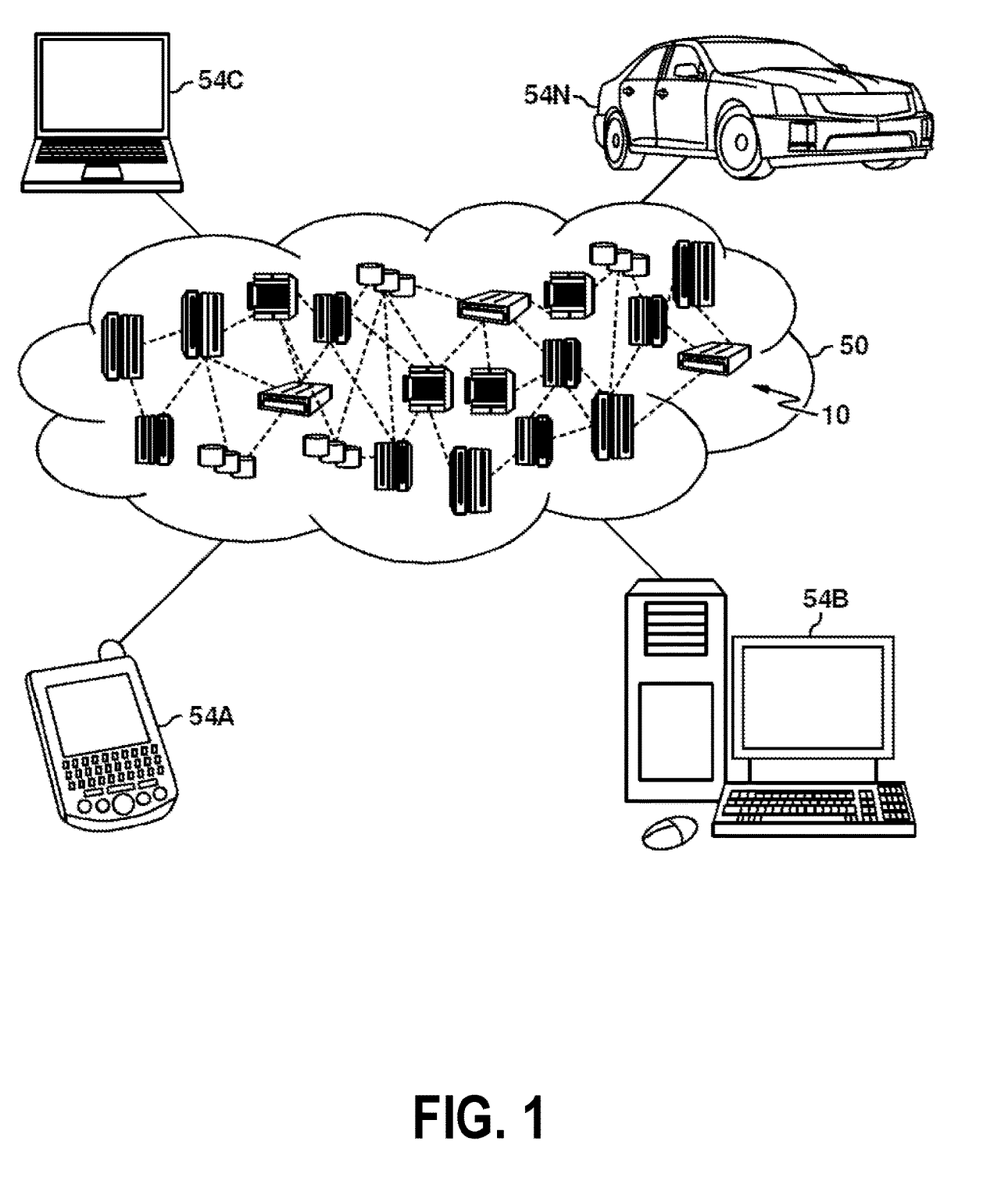
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
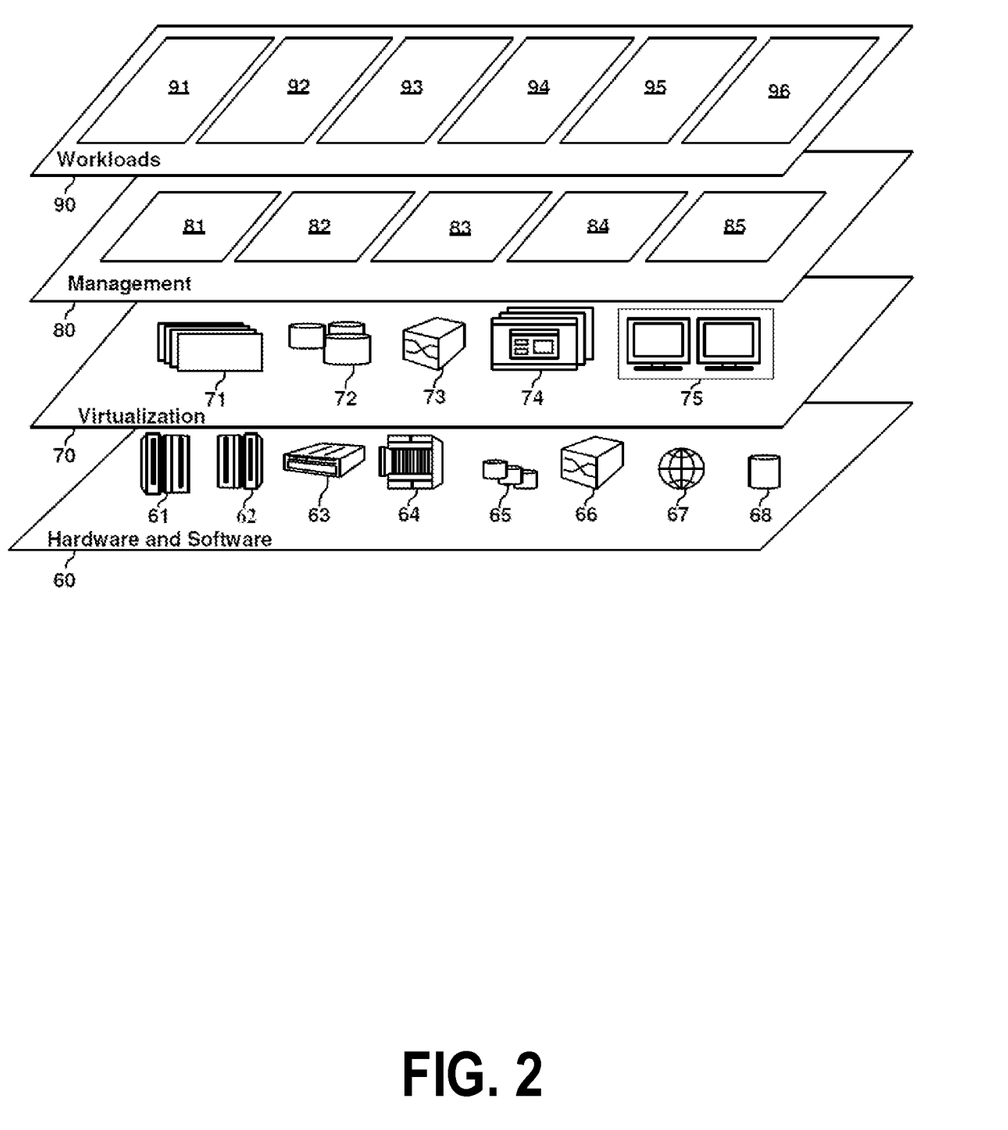
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of systems, computer program products, and methods for virtual interactivity in a broadcast content-delivery medium.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
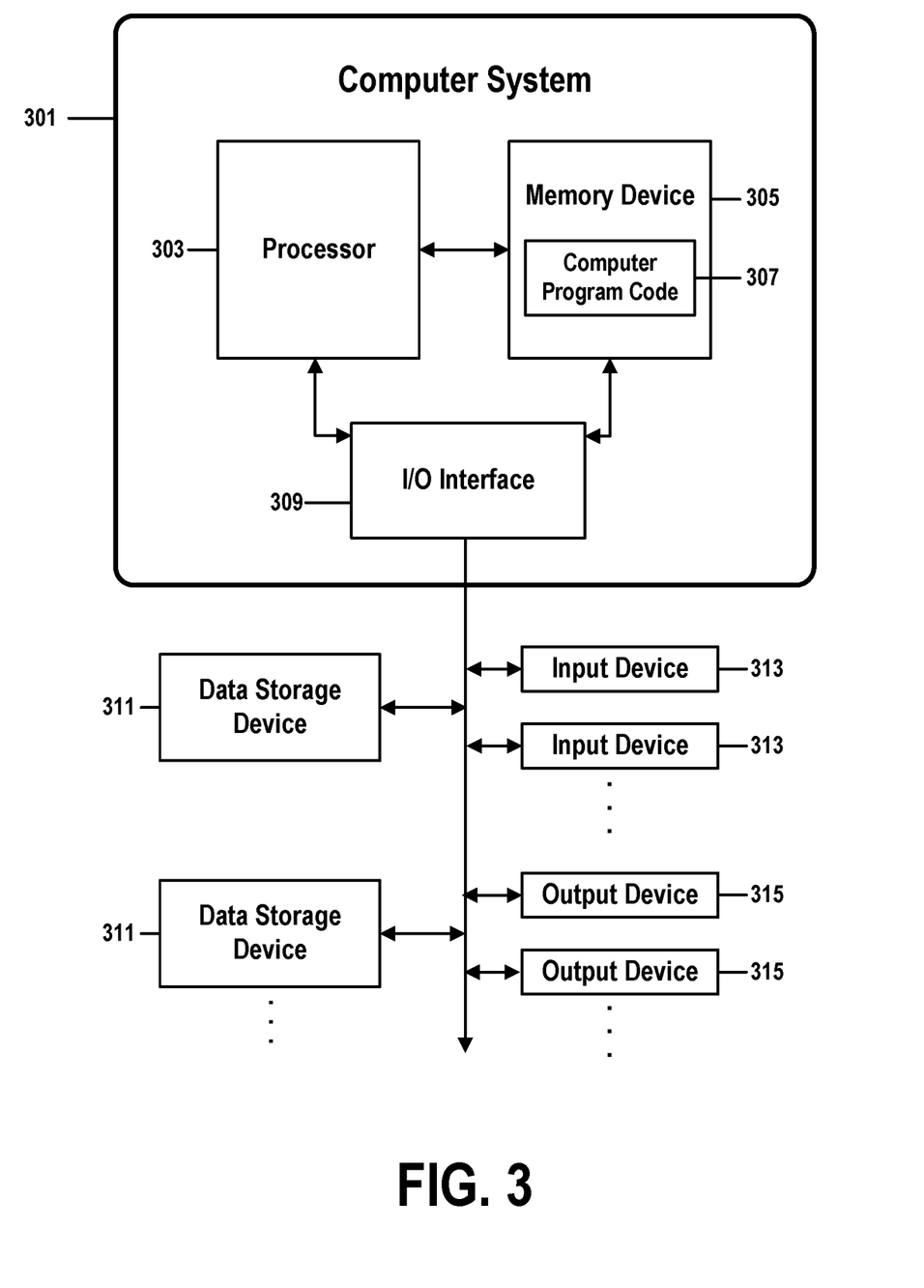
FIG. 3 shows the structure of a computer system and computer program code that may be used to implement a method for virtual interactivity in a broadcast content-delivery medium in accordance with embodiments of the present invention.

FIG. 3 shows a structure of a computer system and computer program code that may be used to implement a method for virtual interactivity in a broadcast content-delivery medium in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for virtual interactivity in a broadcast content-delivery medium in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for virtual interactivity in a broadcast content-delivery medium.

Any of the components of the present invention could be created, integrated, hosted, maintained, deployed, managed, serviced, supported, etc. by a service provider who offers to facilitate a method for virtual interactivity in a broadcast content-delivery medium. Thus the present invention discloses a process for deploying or integrating computing infrastructure, comprising integrating computer-readable code into the computer system 301, wherein the code in combination with the computer system 301 is capable of performing a method for virtual interactivity in a broadcast content-delivery medium.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for virtual interactivity in a broadcast content-delivery medium may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for virtual interactivity in a broadcast content-delivery medium is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
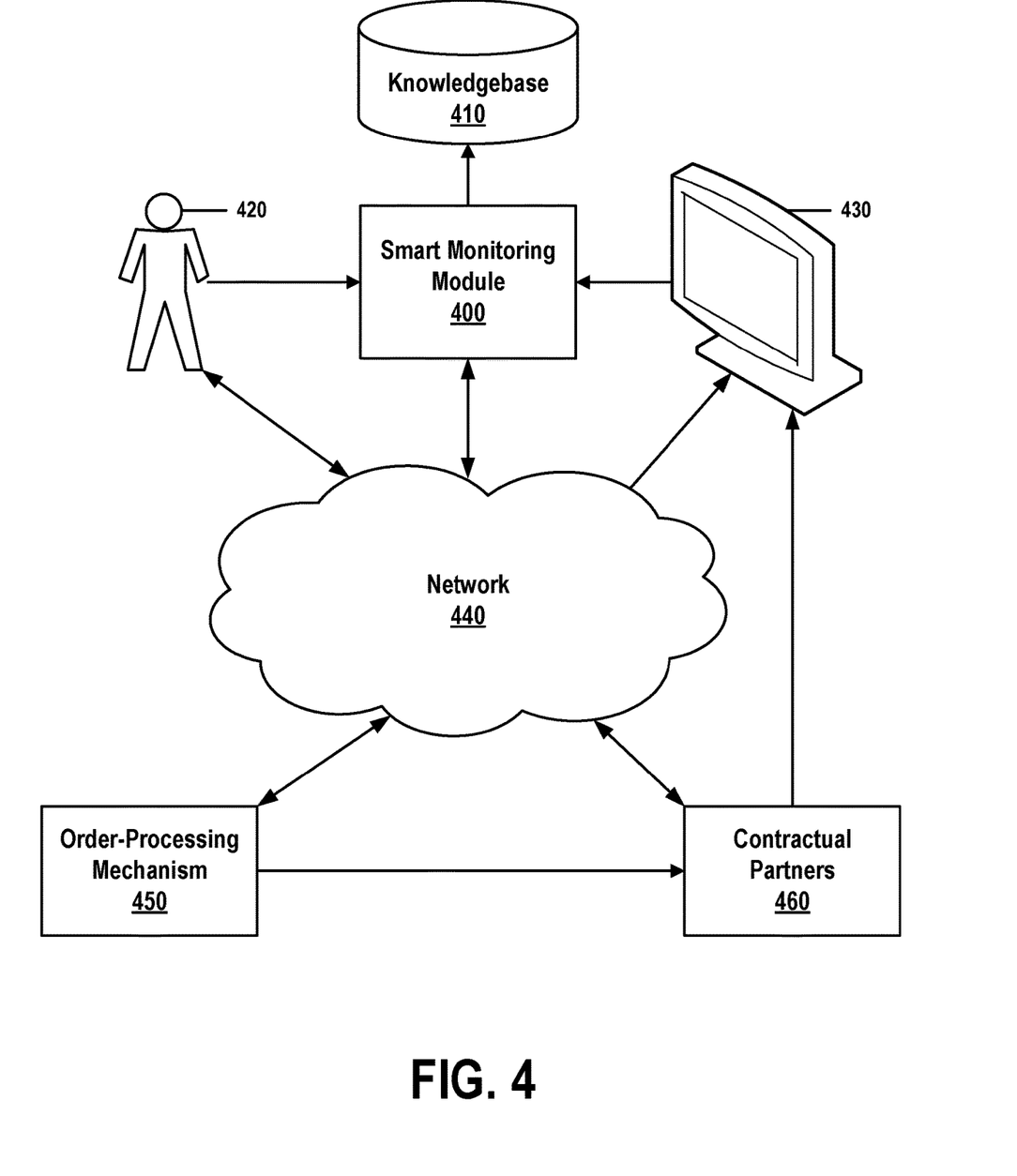
FIG. 4 shows components of a system for virtual interactivity in a broadcast content-delivery medium in accordance with embodiments of the present invention.

FIG. 4 shows components of a system for virtual interactivity in a broadcast content-delivery medium in accordance with embodiments of the present invention. FIG. 4 shows item 400-460, which may be implemented on platforms shown in FIGS. 1-3.

Item 400 is a "smart" monitoring device, such as a smart-home speaker system that listens for a spoken command and then responds to such a command by performing an action like displaying a Web page on a computer screen, performing an e-commerce transaction, directing a television set to begin streaming requested content, or downloading the content and streaming the downloaded content to the television set. In some embodiments, the smart device 400 is an enhanced smart-home device that performs the method of FIG. 5.

Smart device 400 monitors programming being consumed by a user 420 on unidirectional content-delivery device 430. The content may be any audio, video, or other content played on content-delivery device 430. Device 400 may use any means known in the art to identify specific elements of the delivered programming content.

For example, device 400 may retrieve and use rules, data, and other information stored in knowledgebase 410 to identify audio snippets that may be used to identify a particular television show, radio show, commercial advertisement, a request for a user action (such as an invitation to vote for a contestant or answer a game question), or any other type of identifying audio pattern preferred by an implementer. If smart device 400 comprises an audio interface, device 400 may listen for such identifying audio elements through methods similar to those used by voice-activated smart-home devices, smartphones, tablets, and other types of mobile devices.

The programming may be sent unidirectionally to content-delivery device 430 through either a network 440, such as the Internet (and optionally through the smart device 400), or directly from a content provider or other contractual partner 460. For example, delivered content may have been streamed from a video service through the Internet 440 (optionally under control of smart device 400), or sent directly to content-delivery device 430 through a proprietary connection between the content provider 460 and the content-delivery device 430.

The identifying information may comprise other types of content, such as video content that allows device 400 to identify a particular television or radio show, commercial advertisement, request for a user action, object, pixel pattern, alphanumeric content, or any other type of identifying visual information.

In one example, device 400 may be equipped with a camera that monitors content displayed on a television 430, or may comprise a means of intercepting and analyzing a video stream, via a hardwired, wireless, or networked connection, as the stream is displayed on television 430.

Device 400 may use other methods to determine when a particular piece of content is delivered to the user 420. For example, if the smart device 400 is itself streaming the audio or visual content being monitored, device 400 may know, through a content-delivery scheduled retrieved from knowledgebase 410, the exact time at which specific programming, commercials, and other types of content are scheduled to be delivered through the medium being used by device 400.

Device 400 may use similar audio-monitoring methods to recognize environmental audio as a command spoken by a user 420. Device 400 responds to this recognition by correlating the recognized command with a previously detected element of unidirectional content. This correlation may be made by any means known in the art, such as by detecting temporal proximity (for example, determining that a spoken command to purchase a product was given within a predetermined duration of time after the speaking user 420 had watched a television commercial for that product), by extracting predetermined keywords or keyphrases from the monitored audio, or by using artificially intelligent technologies like natural-language recognition or cognitive analytics to infer related semantic meanings from the user audio and from the delivered-content audio. Device 400 may determine when and how to perform some or all of these tasks, identifications, and correlations by referring to rules and data stored in knowledgebase 410.

In some embodiments, rather than performing a specific action in response detecting a correlation between a user action and broadcast content, device 400 may simply notify a downstream order-processing mechanism 450 of the correlation between the user action and the delivered content. The order-processing mechanism 450 may be an integrated component of smart device 400, an independent downstream system, or a component of a system managed by a contractual partner 460. Order-processing-mechanism 450 performs any downstream activities that must be performed when a user 420 responds in the detected manner to the detected content. As mentioned above, these activities may comprise tasks like authorizing a royalty or clickthrough payment, effecting such a payment by transferring funds, reporting to a content provider an answer to a question or a user's choice from a set of options, updating a user-behavior statistic, or other types of activities deemed relevant by an implementer.

Figure 5:
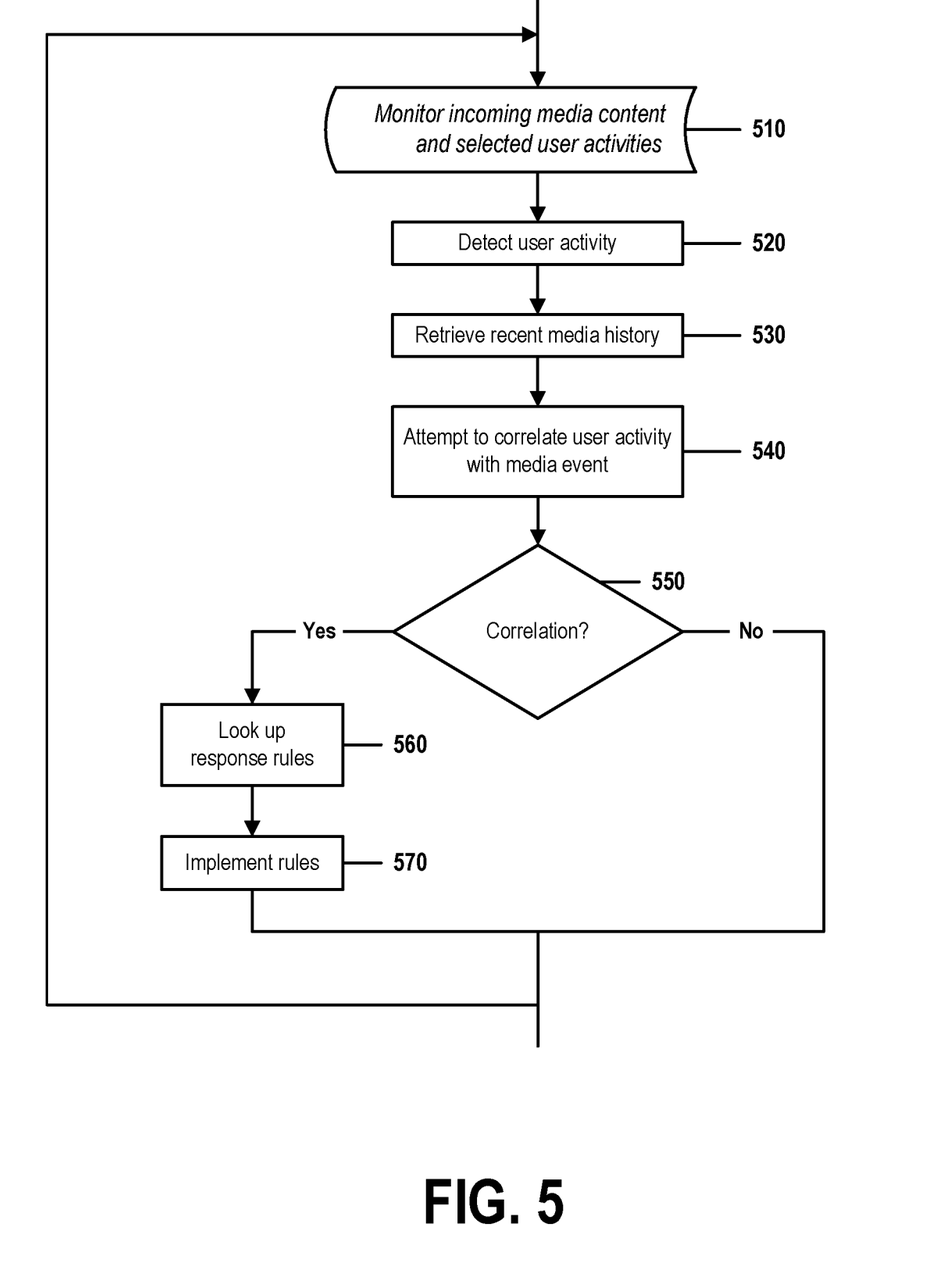
FIG. 5 is a flow chart that illustrates steps of a method for virtual interactivity in a broadcast content-delivery medium in accordance with embodiments of the present invention.

FIG. 5 is a flow chart that illustrates steps of a method for virtual interactivity in a broadcast content-delivery medium in accordance with embodiments of the present invention. FIG. 5 contains steps 510-570. which may be performed by embodiments that incorporate the components of FIG. 4.

Step 510 begins an iterative procedure of steps 510-570, which repeats continuously while smart device 400 is operating. During this procedure, smart device 400 continuously monitors sound that can be detected through an audio interface integrated into smart device 400. This sound may, for example, include utterances of a user 420 that may be detected by the audio interface.

During iterations of this procedure, smart device 400 also monitors unidirectional content being received from a content-provider/contractual partner 460 and presumably being consumed by the user 420 through content-delivery device 430. This content may be transmitted through a network 440, such as the Internet, or through any unidirectional or broadcast communications mechanism capable of delivering content to content-delivery device 430.

Smart device 400 may be configured to operate as a conventional standalone speaker-like device, listening to and responding to user commands that direct device 400 to perform various tasks. These tasks may include, for example: conducting e-commerce transactions like ordering goods or services through the Internet; identifying and directing user-selected content to content-delivery device

430; and providing informational services like answering user questions and giving directions.

In some embodiments, smart device 400 may be integrated into content-delivery device 430, or may be a component of an integrated system that includes both smart device 400 and content-delivery device 430. Such configurations allow content-delivery device 430 or the integrated system to offer "smart" functionality similar to that described above, such as responding in one step to a content request by automatically searching for requested content, downloading that content from a contractual partner or content source 460, and then displaying the downloaded content to a user.

In embodiments where the smart device 400 participates in the selecting, downloading, streaming, or playing of requested content, smart device 400 may be able to identify each element of the delivered content as a function of identifying information that had been used by smart device 400 perform these content-delivery functions.

In embodiments where smart device 400 is not configured to be a component of an integrated system, such as a media hub, smart device 400 identifies elements of the delivered content by detecting certain sound patterns through the audio interface.

As described above and in FIG. 4, smart device 400 may supplant this free-air listening method of identification with other mechanisms. For example, smart device 400 may refer to information stored in knowledgebase 410 for logic and data that, using known methods of cognitive analytics, natural-language processing, or other technologies of artificial intelligence, assists device 400 in correlating detected sound with specific elements of delivered content.

Knowledgebase data may, for example, include digital recordings of sounds comprised by a television-show soundtrack, a representation of a melody, instrumental part, or rhythm track of a song, a textual representation of dialog, a snippet of sound, metadata describing characteristics like duration, dynamic range, or frequency spectrum of an audio clip, or an aural "fingerprint" that is computed by performing computational operations upon characteristics of an audio clip.

Knowledgebase logic can comprise rules that allow smart device 400 to more precisely infer meaning from captured sound. Such rules might, for example, include rules interpreting the stored data, for comparing the stored data to data characterizing the captured sound, or for inferring semantic meaning from the captured sound. In some embodiments, smart device 400 may infer from more complex knowledgebase logic that a particular element of content is being broadcast by considering rules that relate a sequence of multiple audio or video elements, such as audio or video elements of an ordered sequence of commercial advertisements, to a particular television network's programming schedule.

Some embodiments of smart device 400 may interface with, or may comprise, a visual-content capture device, such as a video camera or a still camera, in order to identify delivered content by detecting characteristic video elements of the content. In such embodiments, smart device 400 may, during iterations of the procedure of steps 510-570, identify downloaded content by determining that a particular visual object, pixel pattern, pattern of motion, or other visual characteristic of content is being displayed on content-delivery device 430.

For example, and as described in FIG. 4, smart device 400 may determine that a particular motion-picture advertisement is airing when determining that a pair of starring actors can be seen in a particular pose on a screen of the content-delivery device 430. In another example, smart device 400 may determine that a product-placement for a soft drink is being shown by detecting the soft drink's trademarked colors and logo at a particular location of the screen. Yet another embodiment of smart device 400 may respond to a textual banner scrolling across the bottom of the content-delivery device 430's screen inviting viewers to call a phone number to order an advertised service.

As with embodiments that use audio content to identify content, implementations of smart device 400 that are integrated with or that are comprised by a content-delivery device 430 or other integrated system, may monitor video content electronically, rather than through a camera or other visual-capture device. For example, if the functionality of smart device 400 is integrated into a smart TV 430 or into a streaming or non-streaming media hub, smart device 400 could monitor an electronic representation of video being displayed on smart TV 430, determining that a certain characteristic object has been displayed without requiring that electronic representation to be generated by a video camera or other visual-capture device.

Steps comprised by the remainder of the procedure of FIG. 5 implement this functionality.

In step 520, smart device 400, by means of any of the methods described above, determines that a user 420 has performed a certain activity. This activity may comprise a spoken command directed to smart device 400, to a mobile device, computer system, content-delivery device 430 or other device capable of being controlled by a voice command.

Smart device 400, using logic or data that has been preprogrammed into smart device 400's internal memory, or that is retrieved from knowledgebase 410, identifies that the certain activity is an activity that is relevant to contractual partners 460.

In step 530, smart device 400 retrieves, as necessary, recent history identifying the content that has been viewed or listened to by user 420 via content-delivery method 430. This identifying may be performed by any of the methods or technologies described above and in FIG. 4. For example, in this step, smart device 400 may retrieve a log identifying characteristics of the commercial advertisements displayed by content-delivery device 430 over the prior half hour.

In step 540, smart device 400 attempts to correlate the user activity detected in step 520 with one or more of the elements of delivered content identified in step 530. This correlation may be made by any means known in the art, such as by matching a keyword spoken by user 420 with a keyword specified by metadata stored in knowledgebase 410, where that metadata is associated in the knowledgebase 410 with a commercial advertisement identified in step 530. In some embodiments, smart device 400 may use sophisticated methods of artificial intelligence, such as natural-language processing or cognitive analytics, to derive such correlations.

Rules stored in knowledgebase 410, or stored internally in smart device 400's internal memory, may identify additional conditions necessary to establish the correlation. For example, a correlation may require a user activity to occur within a predetermined duration of time after a correlated element of content is displayed. In some embodiments, distinct predetermined durations of time may be set for each distinct element of content or for each type of user action.

In another example, a user 420 may respond to a song suggestion made by a streaming music service accessed through content-delivery device 430 by issuing a voice command instructing smart device 400 to begin streaming the suggested song. But a stored rule may allow smart device 400 to correlate the two events only if the user 420 listens to the entire song (thus triggering a royalty payment), or only if the user 420 purchases and downloads the song.

In step 550, smart device 400 determines whether a correlation has been identified in step 540. If so, the method of FIG. 5 continues with steps 560 and 570. If not, the current iteration of the procedure of steps 510-570 ends and smart device 400 continues to monitor incoming content until the next qualifying user action triggers performance of step 520.

In step 560, if smart device 400 has identified a correlation in step 550, smart device 400 identifies rules and logic that determine how smart device 400 should respond to the identification of the correlation. These rules and logic may be stored in internal storage of smart device 400, may be retrieved from knowledgebase 410, or may be defined by an extrinsic source, such as a database maintained by a contractual partner 460.

As described in FIG. 4, such rules may comprise any activities required by contractual partners/content sources 460 to be performed when a user 420 responds in a particular manner to a particular element of delivered content.

One example of such a rule would state that, if a user 420 commands a smartphone to browse to a particular Web site within 90 seconds of viewing a commercial specifying that site's URL, smart device 400 should respond by notifying the Web site owner and the television channel that broadcast the commercial (both contractual partners 460) that the Web site owner is liable for a micropayment to the television channel.

In step 570, smart device 400 performs the responsive activity identified by one or more rules retrieved in step 560. At the conclusion of step 570, the current iteration of the iterative procedure of steps 510-570 ends and smart device 400 continues to monitor incoming content in step 510 until the next qualifying user action triggers performance of step 520 and the next iteration of the iterative procedure.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A voice-controlled system comprising a processor, a memory coupled to the processor, and a computer-readable hardware storage device coupled to the processor, the storage device containing program code configured to be run by the processor via the memory to implement a method for adding virtual interactivity to a broadcast content-delivery medium, the method comprising:

the system determining that broadcast content has been delivered to a user, where the delivery is performed by transmitting the content through the broadcast content-delivery medium from a content source to a unidirectional content-delivery device;

the system detecting, through an audio interface, that an oral command has been spoken by the user;

the system inferring semantic meaning from the detected command, where the inference indicates that the user has performed a desired action;

the system correlating the performance of the desired action with the broadcast content;

the system retrieving one or more rules as a function of the correlation, where the rules identify a responsive action associated with the correlation between the desired action and the broadcast content; and the system performing the responsive action.

2. The system of claim 1, where the determining is performed by identifying a characteristic of sound received through the audio interface, and where the characteristic identifies an audio component of the broadcast content.

3. The system of claim 1, where the determining is performed by identifying a characteristic of an audio signal received through an electronic interface, and where the characteristic identifies an audio component of the broadcast content.

4. The system of claim 1, where the determining is performed by identifying a visual element of the broadcast content, where the visual element is identified through a video-input interface, and where the visual element identifies a video component of the broadcast content.

5. The system of claim 1, where the determining is performed by identifying a characteristic of a video signal received through an electronic interface, and where the characteristic identifies a video component of the broadcast content.

6. The system of claim 1, where the determining is performed as a function of previously stored information specifying that the broadcast content is scheduled to be broadcast at a particular time through the broadcast content-delivery medium.

7. The system of claim 1, where the correlating is performed by determining that the desired action was performed during a specified duration of time after the delivery of the broadcast content.

8. The system of claim 1, where the inferring is performed as a function of logic and data stored in a self-learning knowledgebase.

9. The system of claim 1, where the desired action is performed through a bidirectional, voice-controlled interactive communications device.

10. The system of claim 1, where the broadcast content is a solicitation to perform the desired action.

11. The system of claim 1, where the desired action is selected from the group consisting of: purchasing goods, purchasing a service, selecting an option from a group of candidate options, navigating a network, and sending a message through an interactive medium.

12. The system of claim 1, where the responsive action is selected from the group consisting of: authorizing a payment to be made from an account of the content provider to an account of the content-delivery medium; transferring a payment from the account of the content provider to the account of the content-delivery medium, and notifying the content provider that the user has performed the desired action.

13. A method for adding virtual interactivity to a broadcast content-delivery medium, the method comprising:
a voice-controlled system comprising a processor, a memory coupled to the processor, and a computer-readable hardware storage device coupled to the processor, the storage device containing program code configured to be run by the processor via the memory to implement the method for adding virtual interactivity to a broadcast content-delivery medium, the method comprising:
the system determining that broadcast content has been delivered to a user, where the delivery is performed by transmitting the content through the broadcast content-delivery medium from a content source to a unidirectional content-delivery device;
the system detecting, through an audio interface, that an oral command has been spoken by the user;
the system inferring semantic meaning from the detected command, where the inference indicates that the user has performed a desired action;
the system correlating the performance of the desired action with the broadcast content;
the system retrieving one or more rules as a function of the correlation, where the rules identify a responsive action associated with the correlation between the desired action and the broadcast content; and
the system performing the responsive action.

14. The method of claim 13,
where the determining is performed by identifying a characteristic of sound received through the audio interface, and
where the characteristic identifies an audio component of the broadcast content.

15. The method of claim 13, where the determining is performed as a function of previously stored information specifying that the broadcast content is scheduled to be broadcast at a particular time through the broadcast content-delivery medium.

16. The method of claim 13, where the correlating is performed by determining that the desired action was performed during a specified duration of time after the delivery of the broadcast content.

17. The method of claim 7, further comprising providing at least one support service for at least one of creating, integrating, hosting, maintaining, and deploying computer-readable program code in the computer system, wherein the computer-readable program code in combination with the computer system is configured to implement the determining, the detecting, the inferring, the correlating, the retrieving, and the performing.

18. A computer program product, comprising a computer-readable hardware storage medium having a computer-readable program code stored therein, the program code configured to be executed by a voice-controlled system comprising a processor, a memory coupled to the processor, and a computer-readable hardware storage device coupled to the processor, to implement a method for adding virtual interactivity to a broadcast content-delivery medium, the method comprising:
the system determining that broadcast content has been delivered to a user, where the delivery is performed by transmitting the content through the broadcast content-delivery medium from a content source to a unidirectional content-delivery device;
the system detecting, through an audio interface, that an oral command has been spoken by the user;
the system inferring semantic meaning from the detected command, where the inference indicates that the user has performed a desired action;
the system correlating the performance of the desired action with the broadcast content;
the system retrieving one or more rules as a function of the correlation; where the rules identify a responsive action associated with the correlation between the desired action and the broadcast content; and
the system performing the responsive action.

19. The computer program product of claim 18,
where the determining is performed by identifying a characteristic of sound received through the audio interface, and
where the characteristic identifies an audio component of the broadcast content.

20. The computer program product of claim 18, where the correlating is performed by determining that the desired action was performed during a specified duration of time after the delivery of the broadcast content.

\* \* \* \* \*